(12) United States Patent
Andreychuk et al.

(10) Patent No.: US 10,267,140 B2
(45) Date of Patent: Apr. 23, 2019

(54) EXTENDABLE/COLLAPSIBLE APPARATUS FOR FRACTURE IMAGING AND USE OF SAME

(71) Applicant: Kobold Services inc., Calgary (CA)

(72) Inventors: Mark Andreychuk, Calgary (CA); Per Angman, Calgary (CA); Allan Petrella, Calgary (CA)

(73) Assignee: KOBOLD CORPORATION, Calgary (CA)

( * ) Notice: Subject to any disclaimer, the term of this patent is extended or adjusted under 35 U.S.C. 154(b) by 259 days.

(21) Appl. No.: 15/177,300

(22) Filed: Jun. 8, 2016

(65) Prior Publication Data

US 2016/0356145 A1 Dec. 8, 2016

Related U.S. Application Data

(60) Provisional application No. 62/172,686, filed on Jun. 8, 2015, provisional application No. 62/259,371, filed on Nov. 24, 2015.

(51) Int. Cl.
| | | |
|---|---|---|
| *G01V 1/46* | (2006.01) | |
| *E21B 47/00* | (2012.01) | |
| *G01V 1/00* | (2006.01) | |
| *G01V 1/28* | (2006.01) | |
| *G01V 1/52* | (2006.01) | |

(52) U.S. Cl.
CPC .......... *E21B 47/0002* (2013.01); *G01V 1/008* (2013.01); *G01V 1/288* (2013.01); *G01V 1/46* (2013.01); *G01V 1/52* (2013.01); *G01V 2210/1234* (2013.01); *G01V 2210/1429* (2013.01)

(58) Field of Classification Search
CPC ...... E21B 47/0002; G01V 1/46; G01V 1/008; G01V 1/288; G01V 1/52; G01V 2210/1234; G01V 2210/1429
USPC ............................................................ 367/25
See application file for complete search history.

(56) References Cited

U.S. PATENT DOCUMENTS 8,711,655 B2 * 4/2014 Gzara .................... G01V 1/44
367/25

FOREIGN PATENT DOCUMENTS

WO WO-2013185225 A1 * 12/2013 ............... G01V 1/40

* cited by examiner

*Primary Examiner* — Daniel L Murphy
(74) *Attorney, Agent, or Firm* — Parlee Mclaws LLP (CGY); Linda Thompson; Sean Goodwin

(57) ABSTRACT

Fracture imaging modules having one or more 3-component sensors, are incorporated into a tool comprising two or more of the modules for detecting microseismic events in a formation from the same wellbore as is being stimulated. The modules are locked together in a compact mode to permit injection into the wellbore through a conventional lubricator which has a fixed length. Once injected into the wellbore, the modules are spaced from one another in an extended mode to form an axially spaced sensor array which increases the measurement window in the wellbore compared to sensor arrays conventionally injected through a fixed length lubricator. Following the operation, the modules are actuated to return to the compact mode for pulling out of the hole through the lubricator.

20 Claims, 13 Drawing Sheets

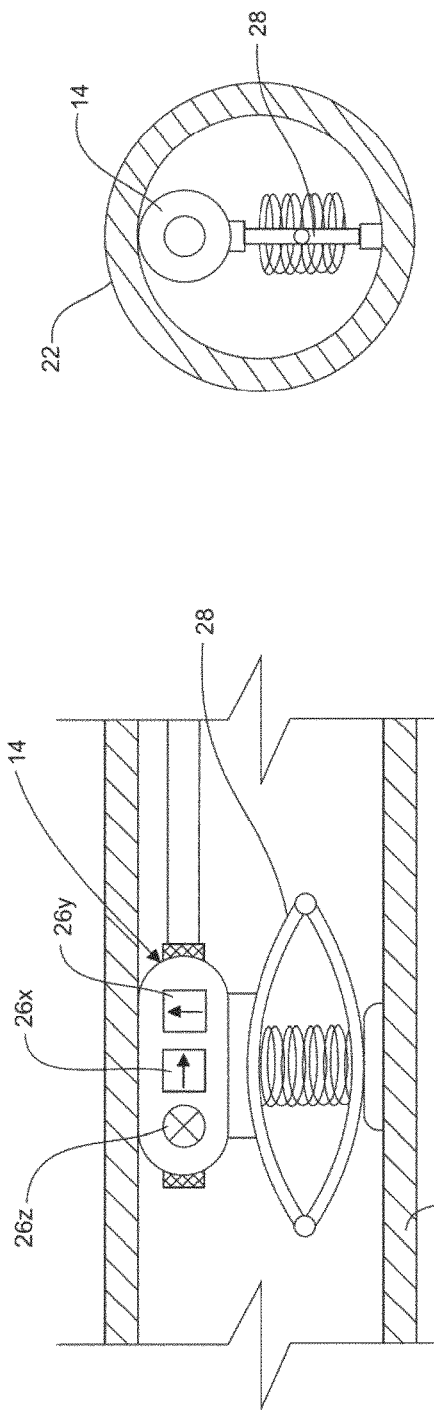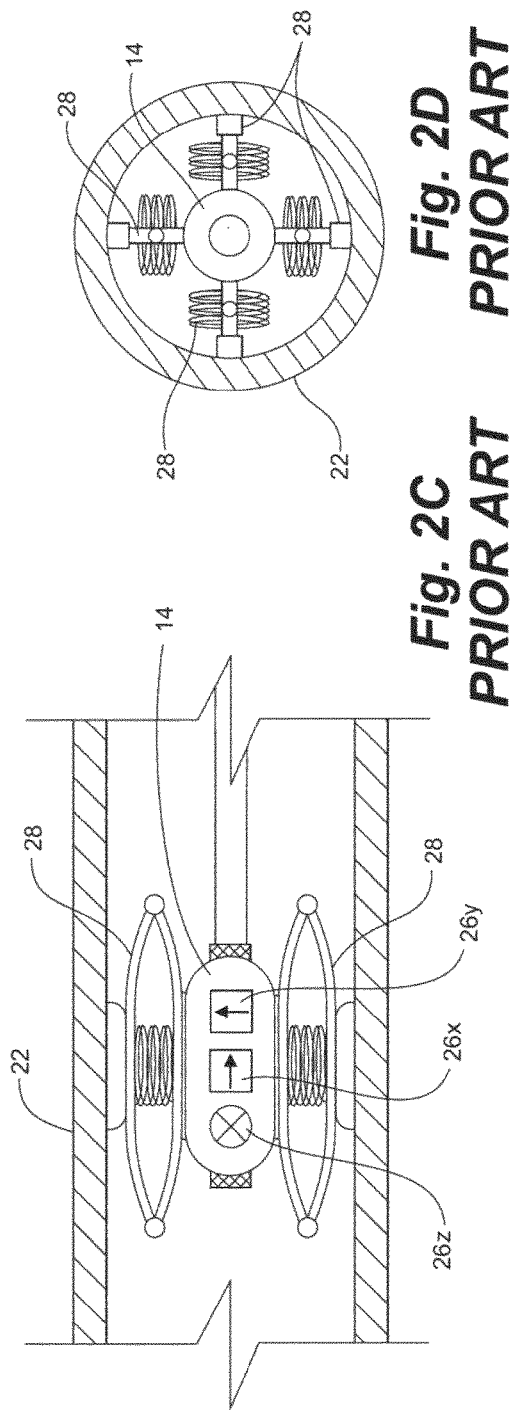
Fig. 2A PRIOR ART
Fig. 2B PRIOR ART
Fig. 2C PRIOR ART
Fig. 2D PRIOR ART

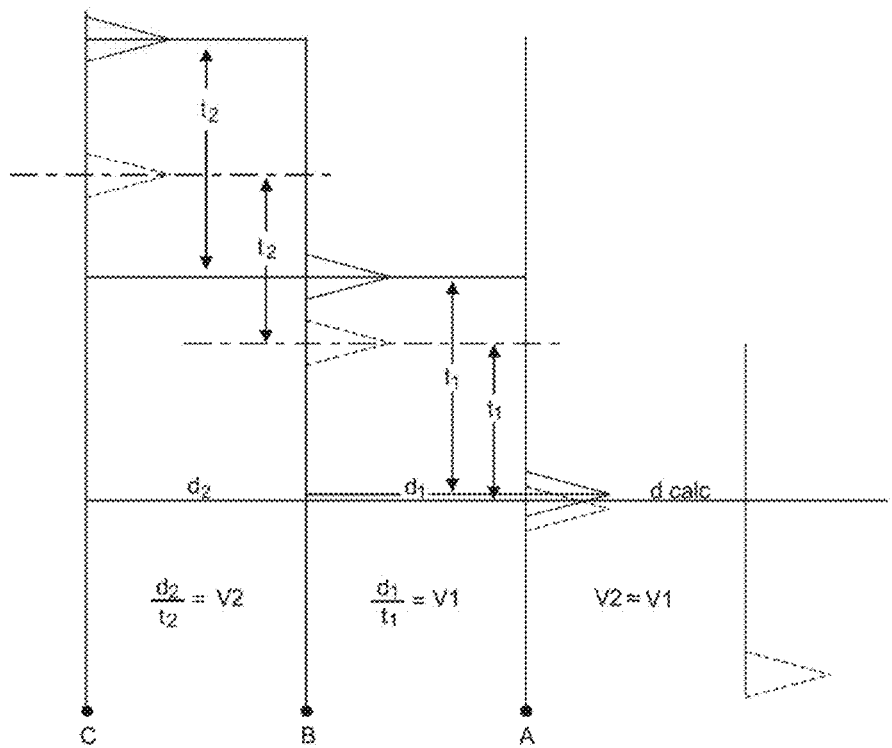
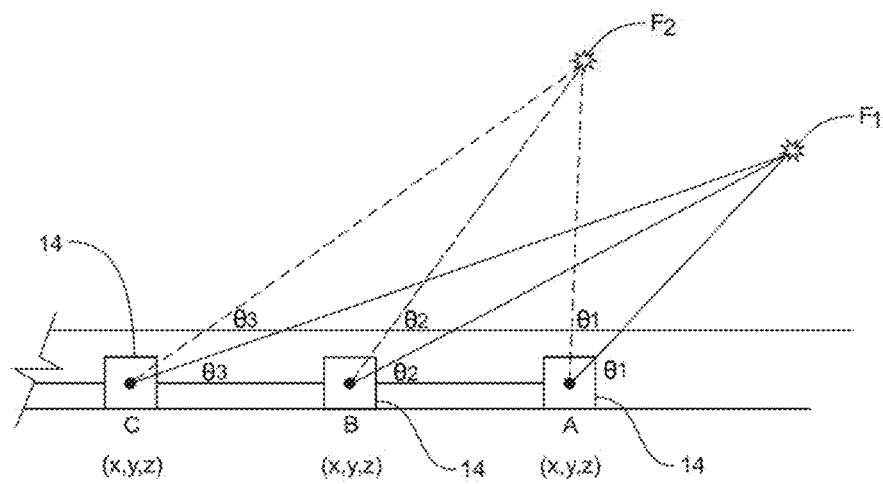
Fig. 3
PRIOR ART

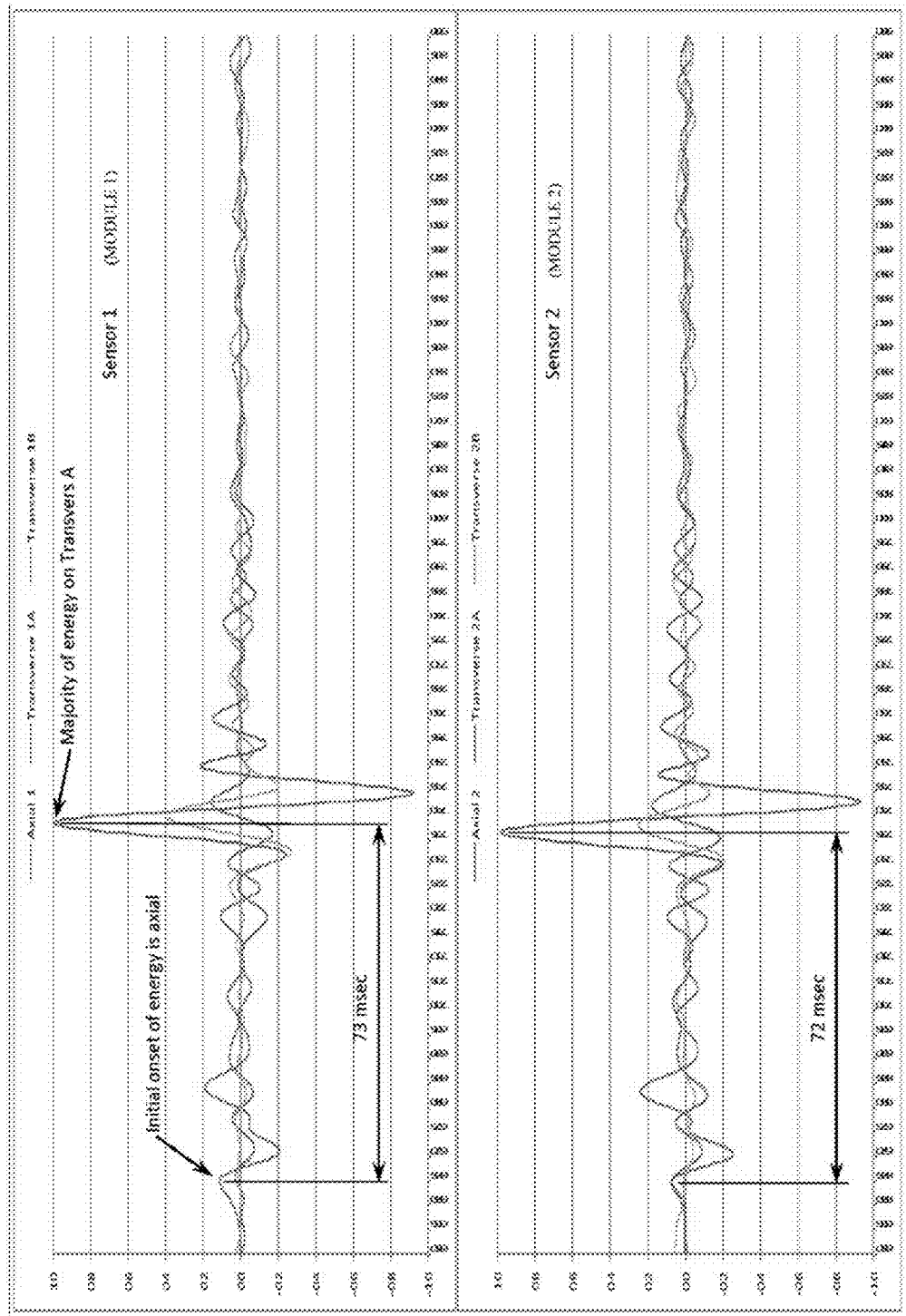

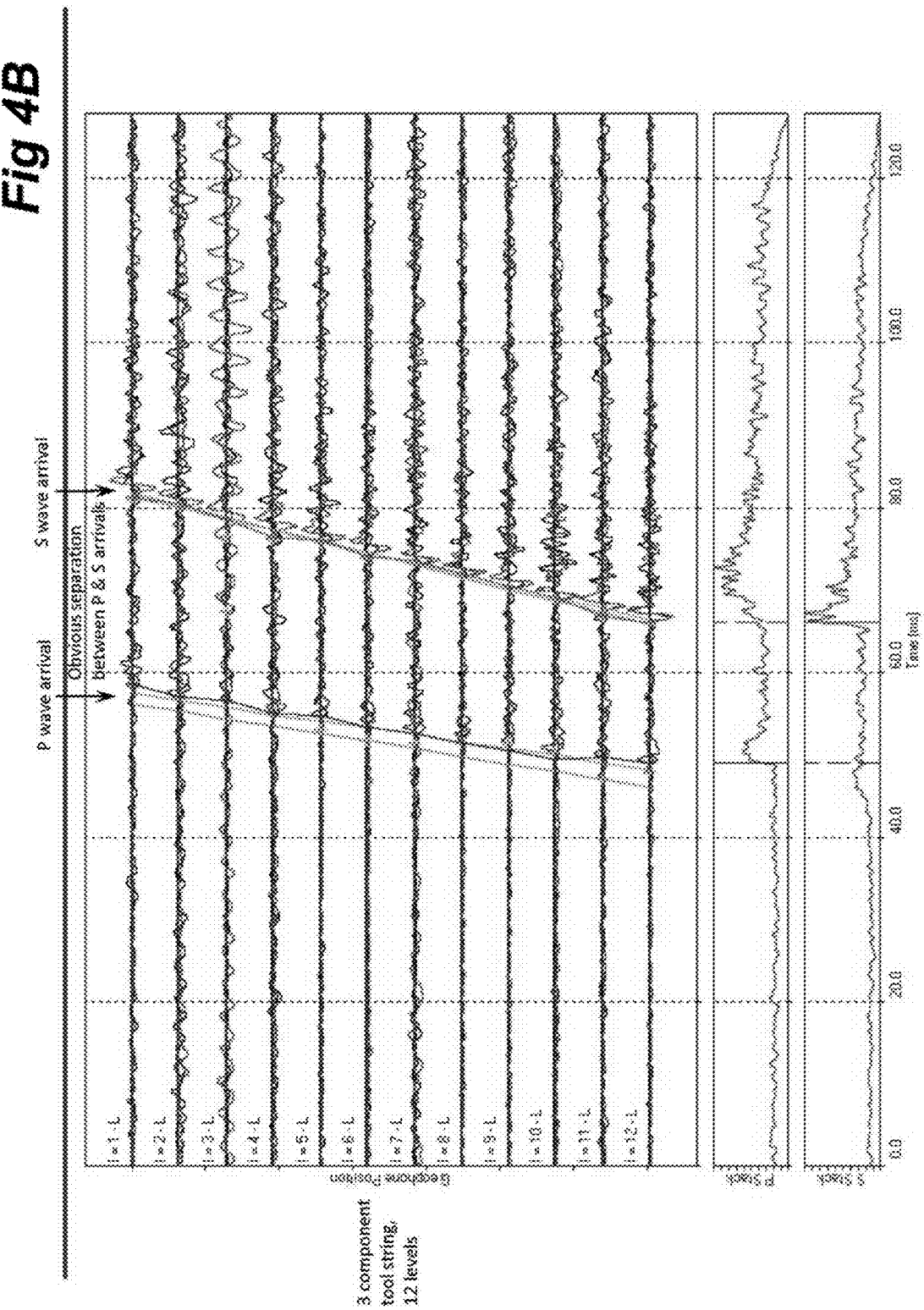

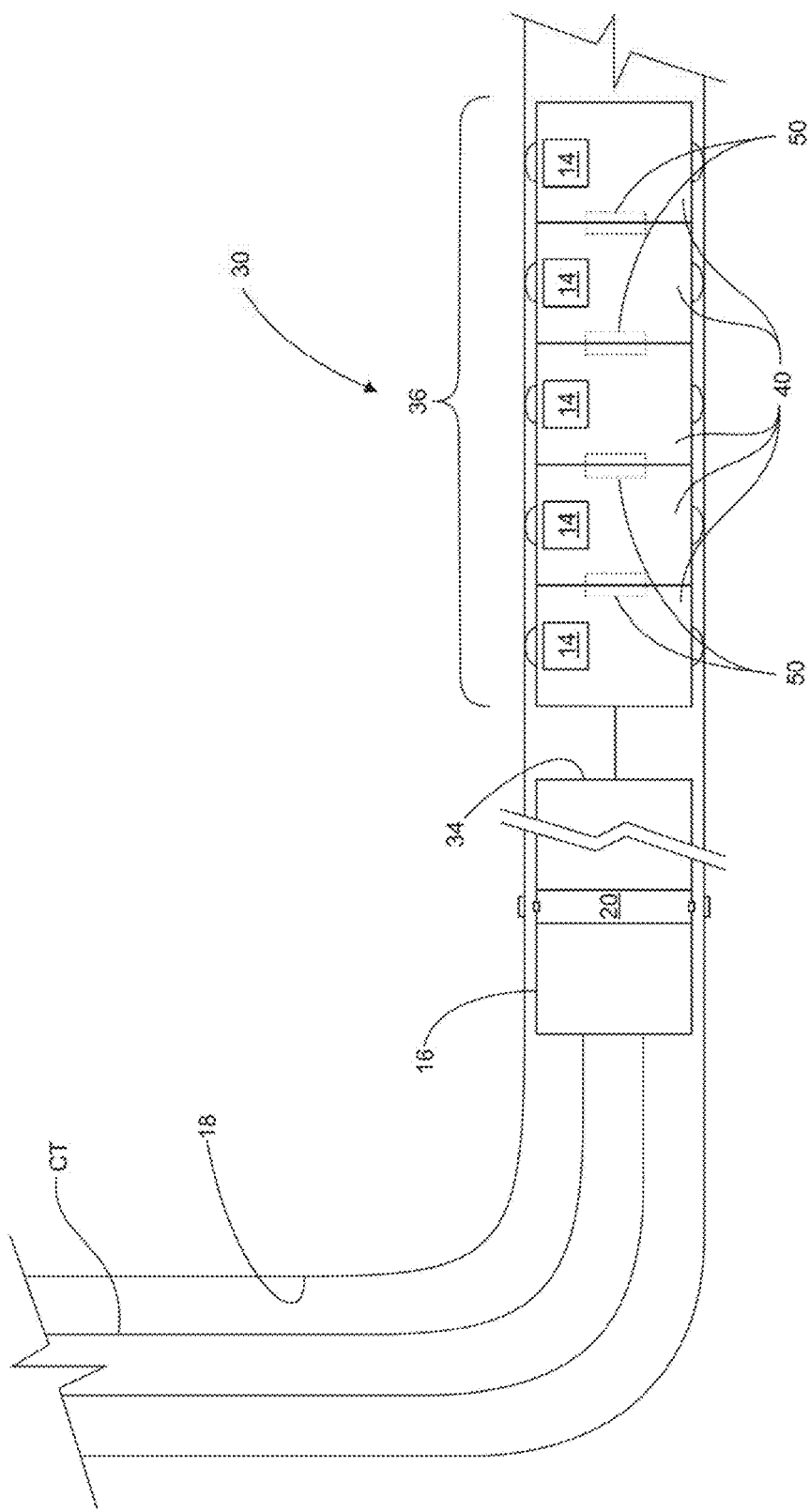

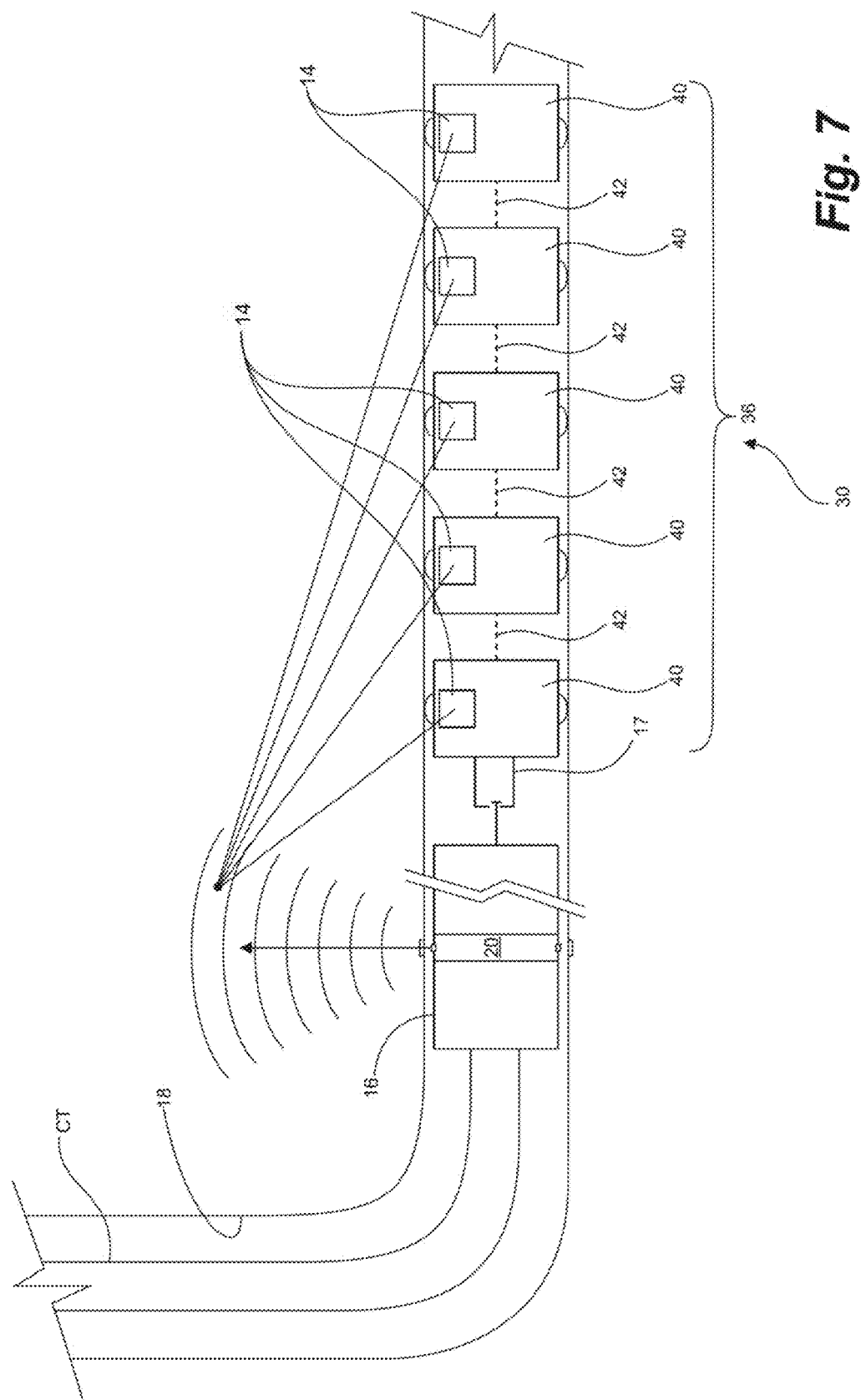

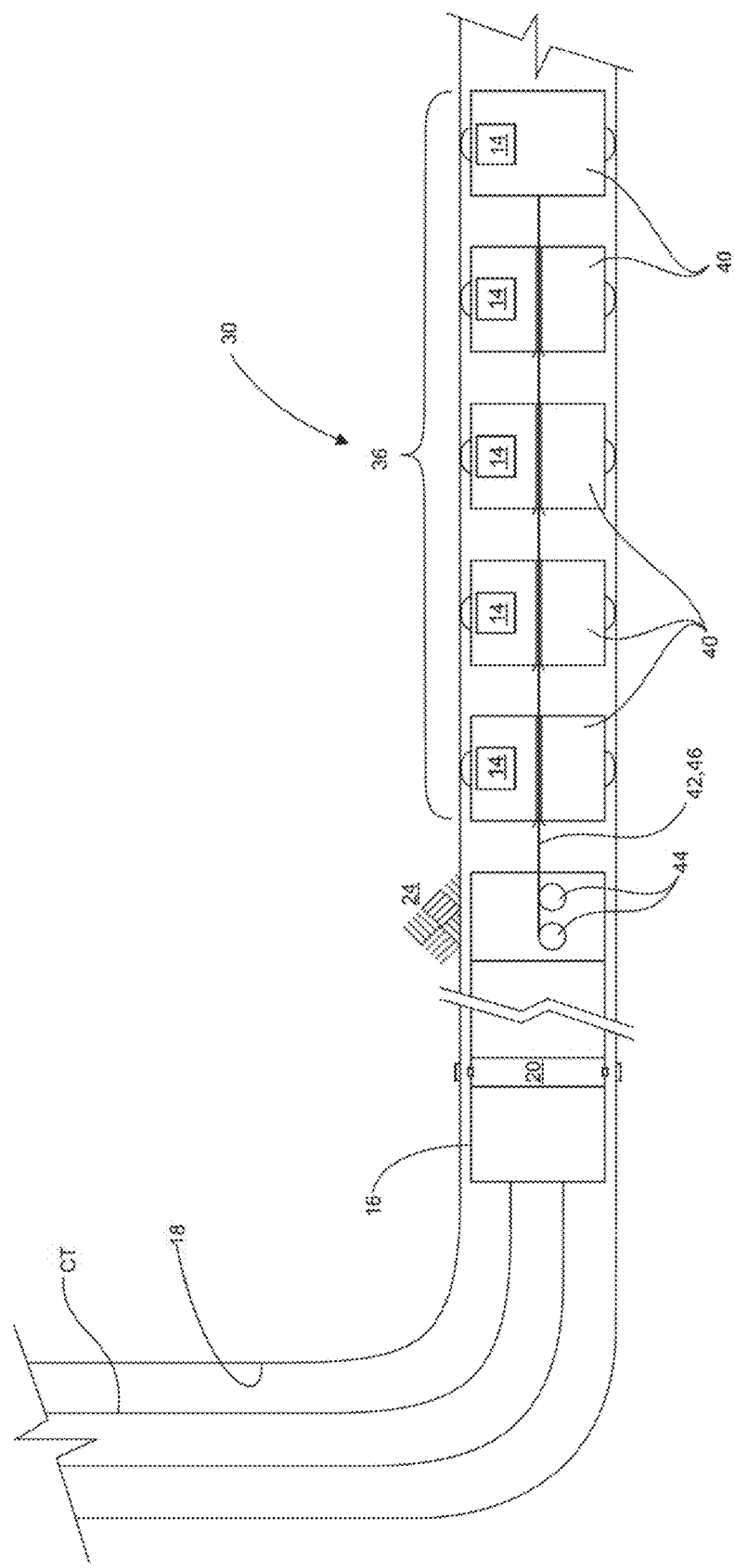

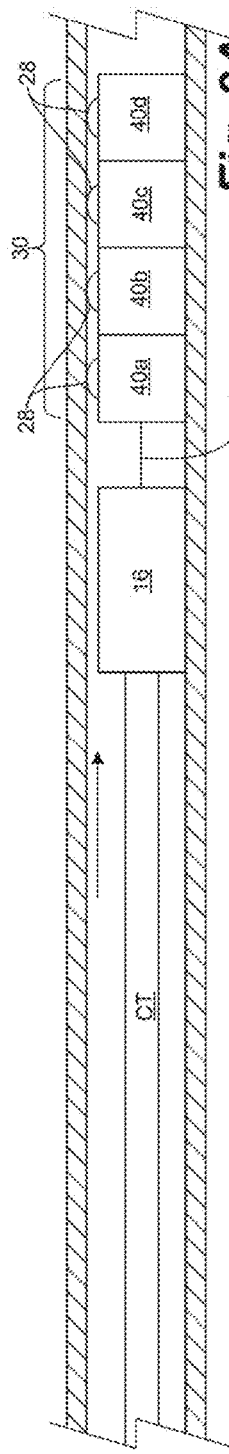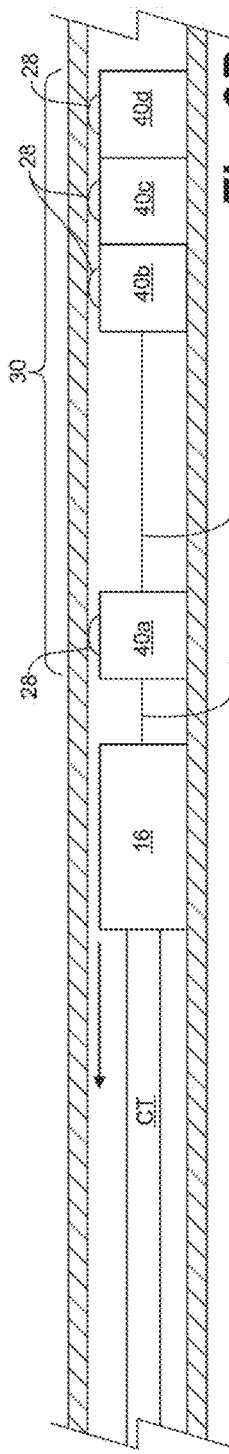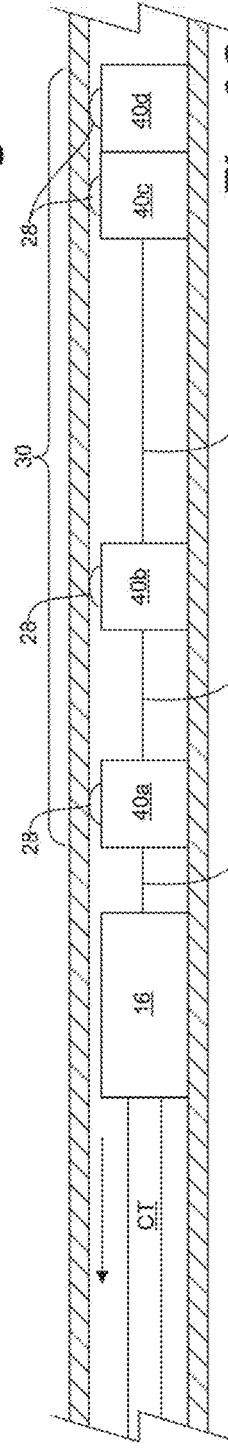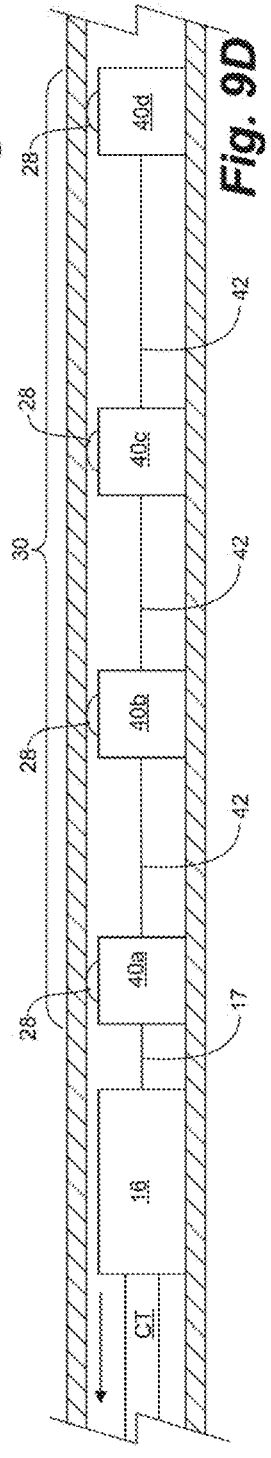

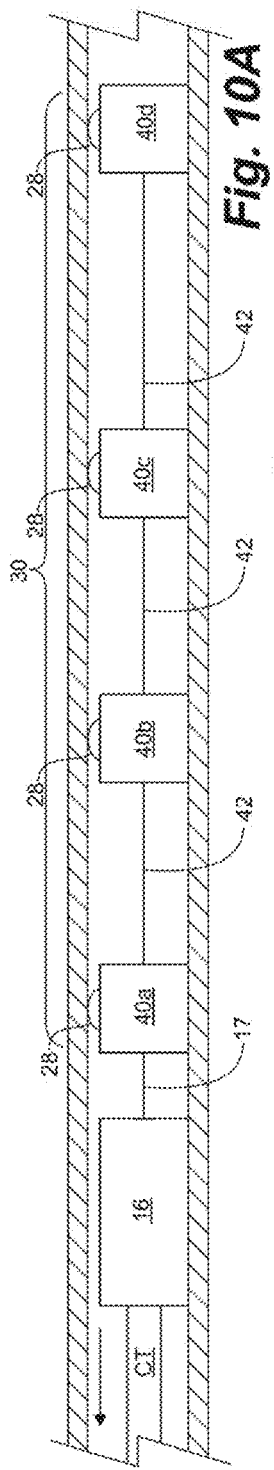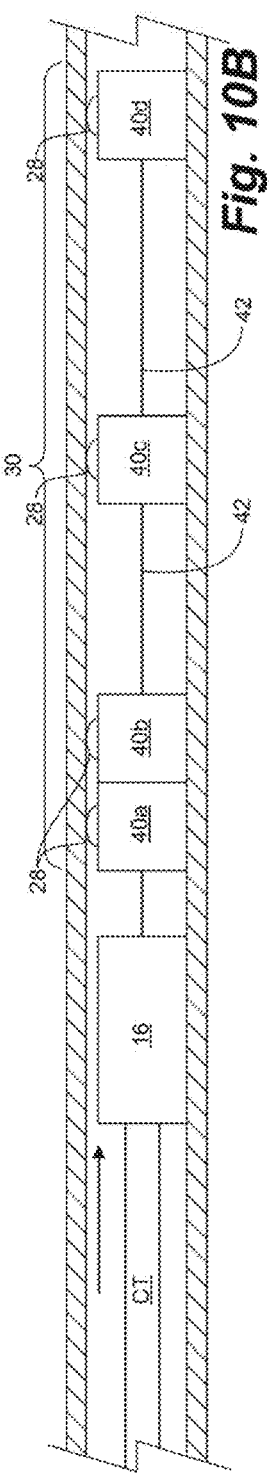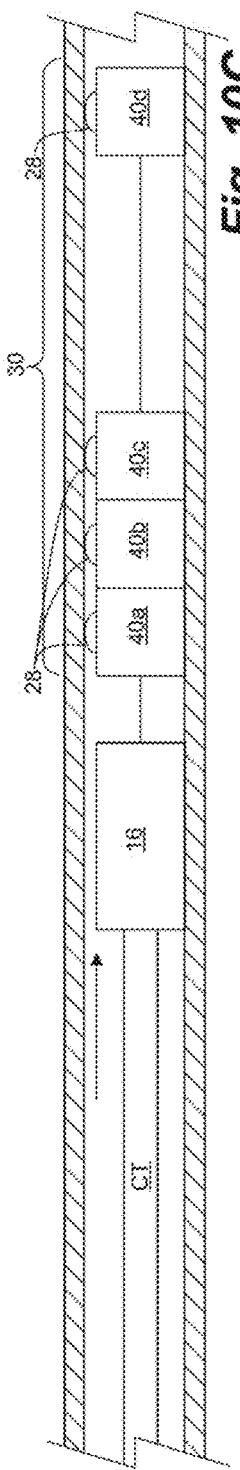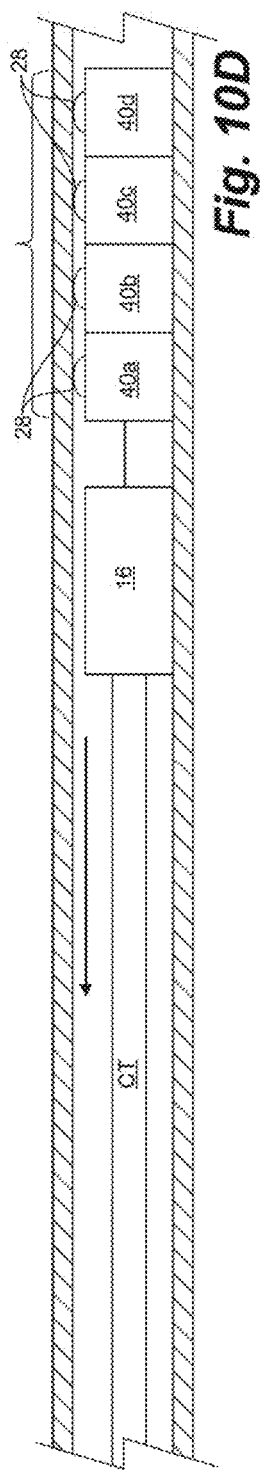

EXTENDABLE/COLLAPSIBLE APPARATUS FOR FRACTURE IMAGING AND USE OF SAME

CROSS-REFERENCE TO RELATED APPLICATIONS

This application claims the benefit of U.S. provisional application 62/172,686, filed Jun. 8, 2015 and U.S. provisional application 62/259,371, the entirety of each of which is incorporated herein by reference.

FIELD

Embodiments are related to apparatus and methods for sensing microseismic events and, more particularly, to spacing of apparatus for detection of microseismic apparatus within a borehole undergoing a fracturing operation.

BACKGROUND

Imaging of microseismic events, particularly as a result of fracturing operations, is well known in the oil and gas industry. Conventional techniques used to image the placement of a fracture within a formation include, but are not limited to, the following: positioning sensors at surface in a surface array, such as in a Fracstar™ system as taught by MicroSeismic Inc., or as taught in U.S. Pat. No. 4,271,696 to Wood; burying sensors at surface in a buried array—such as in a Buried Array™ system as taught by MicroSeismic Inc.; and positioning sensors in remote wells such as taught by U.S. Pat. No. 6,935,424 to Halliburton and Pinnacle Technologies or as taught by U.S. Pat. No. 5,934,373 to Warpinski et al.

Prior art systems that utilize surface or near-surface arrays are located kilometers from the microseismic event locations and as such are limited to only observing larger magnitude events. Deployment and retrieval, if required, can be time consuming and expensive. Systems that are deployed in an adjacent vertical observation well are capable of detecting smaller magnitude events than surface systems, however require the existence of the adjacent well and are only optimally located, such as within several hundred meters, for a small number of frac ports. Systems that are deployed in an adjacent horizontal well, require the presence of the adjacent horizontal well and complicated equipment, such as a wireline tractor or pump assembly and a pump truck having fluid tanks at surface, or other means to deploy the sensor array into the horizontal portion of the wellbore.

The known prior art systems, having sensors which are not located within tools used for fracturing, operate independent of the fracturing operation and remote therefrom.

As taught in US Published patent application 2015-0075783-A1, a 371 application from PCT/CA2013/050329, and US Published patent application 2015-0135819, a 371 application from PCT/CA2013/050441, both to Kobold Services Inc. of Calgary, Alberta, Canada, each of which is incorporated herein by reference in its entirety, a Fracture Imaging Module "FIM" has been designed to attach to a distal end of a fracturing tool in a bottomhole assembly (BHA). The BHA is capable of a variety of types of fracturing operations including, but not limited to, annular fracturing, tubing fracturing, isolation fracturing or combinations thereof. Combining microseismic monitoring within the BHA reduces cost. Offset wellbores are not required and surface or subsurface arrays may not be required. Using embodiments of the BHA incorporating a FIM tool having at least two, and more particularly, three or more 3-component sensors, multi-stage fracturing with real-time microseismic monitoring can be performed within a single coiled tubing run as there is no need to trip the BHA out of the wellbore for each stage to permit separate apparatus, conventionally used to perform microseismic monitoring, to be run into the wellbore. Positioning of the FIM tool in the BHA improves the location of the microseismic sensors relative to the frac treatment area/stage to improve accuracy of monitoring microseismic events which are created by forcing the fracturing fluids into the formation under high pressure.

During the fracturing operations, the fracturing tool/BHA is exposed to vibration and movement when flowing fracturing fluid therethrough at fracturing pressures. The vibration and movement is transmitted to the FIM tool attached thereto which contributes to noise in the microseismic signals received therewith.

Noise, if an issue in the treatment wellbore, can be reduced so the microseismic signals can be detected and identified. US published application 2015-0135819 to Kobold Services Inc. describes one suitable means for removing noise from the microseismic signals using fiber optic cable as a noise detection and cancellation device. The fiber optic cable is run in coiled tubing used to deploy the BHA. The coiled tubing can be conventional coiled tubing or an electrically-enabled coiled tubing (CT), such as IntelliCOIL™, which is described and claimed in U.S. Pat. Nos. 8,567,657, 8,827,140 and 9,194,512, all to MTJ Consulting Services Inc. of Calgary, Alberta, Canada, each of which is incorporated herein by reference in its entirety.

Applicant is aware that others have deployed microseismic sensors in the treatment wellbore. Schlumberger deploys a series of horseshoe-shaped clamps to attach 3-component sensors to the casing. CT runs through the centre of the horseshoes clamps. The 3-component sensors are deployed uphole of the shallowest fracture port, typically in the vertical section of the wellbore and possibly through the build portion of the wellbore. However, the frac is pumped through the CT therefore, the 3-component sensors are not in contact with fluid flow. Such apparatus may be limited in observation distance to the frac ports nearest the heel of the wellbore.

Weatherford has a system which utilizes a wireline to position sensors above the frac zone. The noise of pumping the frac is significant and the results can be compromised.

Weatherford also has a process whereby a tool string comprising microseismic sensors is located downhole of the active frac port(s), the sensors being isolated via a retrievable bridge plug positioned between the frac ports and the sensors. The fracturing operation is suspended to deploy the array and the array must be retrieved after the frac is complete which adds two round trips to the operation at significant cost. The system is likely limited in observation distance to the uphole frac ports nearest the fixed array. Further, as the tool string needs to be retrieved from, and most likely deployed into, a live well, the system presents operational limitations and cost. Due to the limited length of a lubricator of a coil tubing rig for pressure deployment and retrieval, it may be difficult to achieve a significant array length.

Sensors deployed into a treatment wellbore are generally limited in length, in part by the length of the lubricator used to deploy the BHA. As a result of the limited length of the BHA and positioning of the sensors therein, the ability to optimally locate a microseismic event in 3D space, away from the wellbore, is exposed to errors. These errors may be significant.

BHA's are installed and removed from the live wellbore and can be pressure deployed. Using a known system, the BHA is installed in the live well, section by section, which is time consuming and introduces operational risks. Use of coiled tubing (CT) is well known in the oil and gas industry. Coiled tubing has many advantages, one of which is the ability to work in live, pressurized wells. CT is generally used to deploy various bottomhole assemblies (BHA) for a variety of live well applications. Coiled tubing mast rigs typically have a BHA lubricating capacity of about 12 to 15 m at a maximum. For this reason the lubricating length of the BHA at surface is generally restricted for live well applications. Conventional rigs with cranes may be used in combination with longer lubricators, such as from about 30 m to about 40 m, however this is very costly and not a common practice due to equipment availability and safety.

The industry is seeking cost effective, accurate fracture image placement information. To minimize cost of obtaining the fracture image data, there is great interest in accumulating microseismic data during an existing well intervention, such as by effectively and efficiently utilizing modules which can be added to a BHA that provides the conveyance at an acceptable cost.

BRIEF DESCRIPTION OF THE DRAWINGS

FIG. 2A to 2D are representative illustrations of prior art modules according to FIG. 1, having means attached thereto for coupling sensors in the modules to the borehole or casing, more particularly FIGS. 2A and 2B are side and cross-sectional views, respectively, illustrating a spring clamp for coupling the sensor directly to the borehole or casing; and FIGS. 2C and 2D are side and end cross-sectional views respectively illustrating four spring clamps spaced circumferentially about the sensor for centering the sensor in the wellbore, the sensor coupling to the borehole or casing through the clamps FIG. 3 is a representative illustration of a prior art system for location of fractures in the formation using clean signals, after noise attenuation;

FIG. 4A illustrates microseismic data collected using a prior art FIM tool having two 3-component geophones at a fixed distance of about 2 meters;

FIG. 4B illustrates microseismic data collected using a prior art system comprising a sensor array deployed in a remote observation wellbore;

FIG. 6 is a representative illustration of the FIM tool of FIG. 5 following injection into a directional wellbore and in the collapsed mode prior to actuating the FIM tool to an extended mode for extending the spacing between the modules for increasing the measurement window therewith;

FIG. 7 is a representative illustration of a FIM tool according to an embodiment taught herein, a first module being connected to the BHA and acoustically decoupled therefrom for isolating from vibration during the stimulation operation, the FIM tool being actuated to extend spacing between the modules;

FIG. 8 is a representative illustration of the FIM tool according to an embodiment wherein the modules are interconnected by a tether, which is actuated by a signal to extend a length of the tether for increasing the spacing between the modules in the extended mode for detection therewith and for decreasing the length of the tether in the collapsed mode for minimizing spacing therebetween for running-in-hole (RIH) and for pulling-out-of-hole (POOH);

FIGS. 9A to 9D are representative illustrations of a coded sequence of movements of the BHA and FIM tool connected thereto for spacing the modules of the FIM tool in the wellbore to the extended mode, more particularly, FIG. 9A illustrates RIH of the BHA and FIM tool in the collapsed mode to the desired total depth, such as to the toe of the wellbore;

FIG. 9B illustrates, following receipt of a signal to unlock modules in the FIM tool, pulling the BHA uphole against a drag force between a first proximal module and the wellbore for spacing the first proximal module from the remaining modules;

FIGS. 9C and 9D illustrate continuing to pull the BHA and FIM tool uphole with an incrementally increasing pulling force to overcome the drag force of the spaced modules for spacing subsequent modules;

FIGS. 10A to 10D are representative illustrations of a sequence of movements of the BHA and FIM tool connected thereto for decreasing the spacing the modules of the FIM tool in the wellbore to the collapsed mode, more particularly, FIG. 10A illustrates the FIM tool in the fully extended mode, such as following completion of a final treatment of an uphole stage in the wellbore;

FIG. 10B illustrates, following receipt of a signal to permit locking of the modules in the FIM tool, a downhole movement of the BHA and FIM tool for collapsing the spacing between the first proximal module and the remaining spaced modules; and FIGS. 10C and 10D illustrate continuing to move the BHA and FIM tool downhole for collapsing the spacing between the subsequent modules until the FIM tool is in the collapsed mode, the modules locked together for POOH;

SUMMARY

Figure 1:
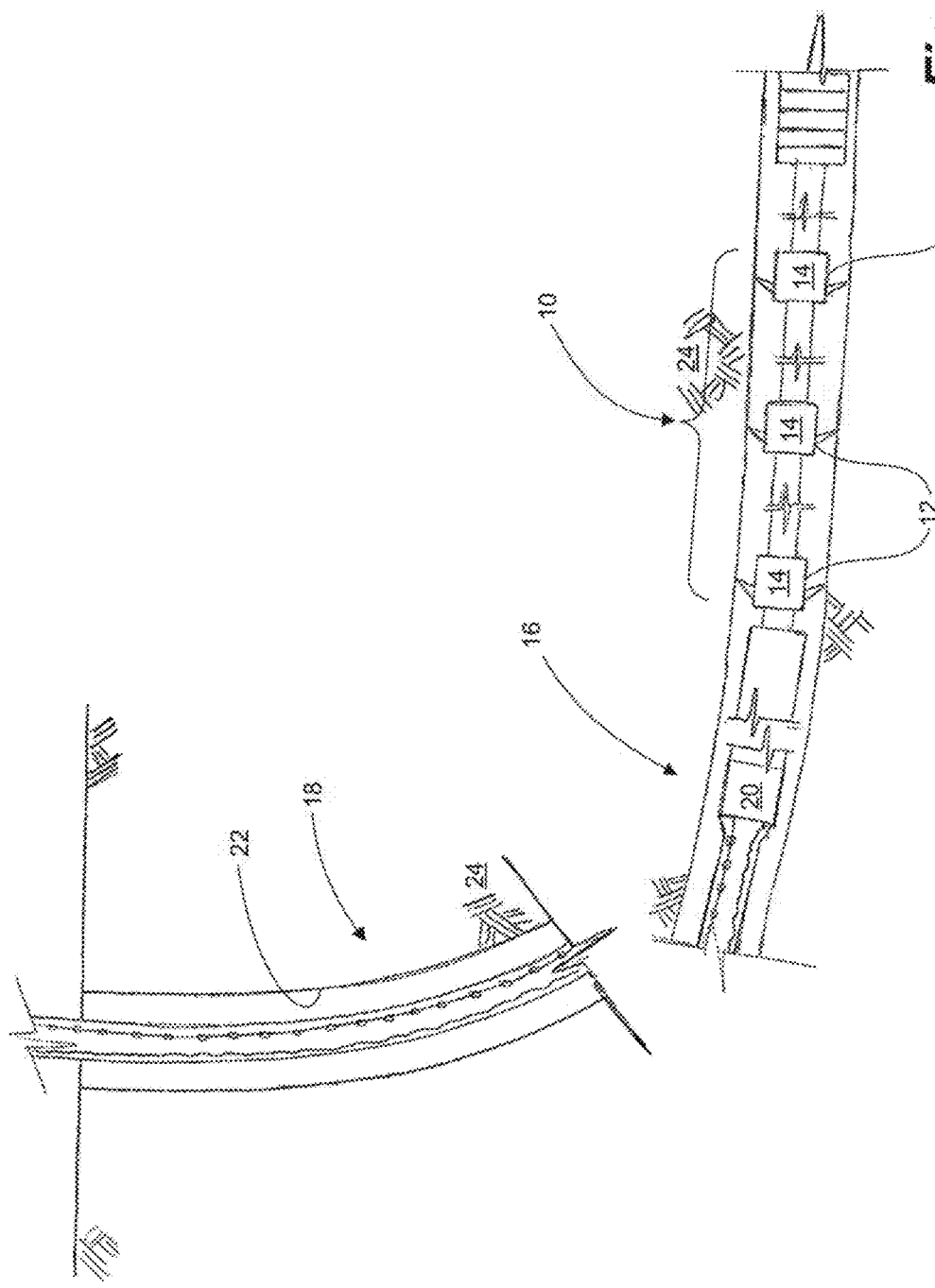
FIG. 1 is a sectional view of a directional wellbore with a prior art bottomhole assembly and fracture imaging module tool attached thereto deployed therein for detecting microseismic events within the wellbore being stimulated.
Figure 5:
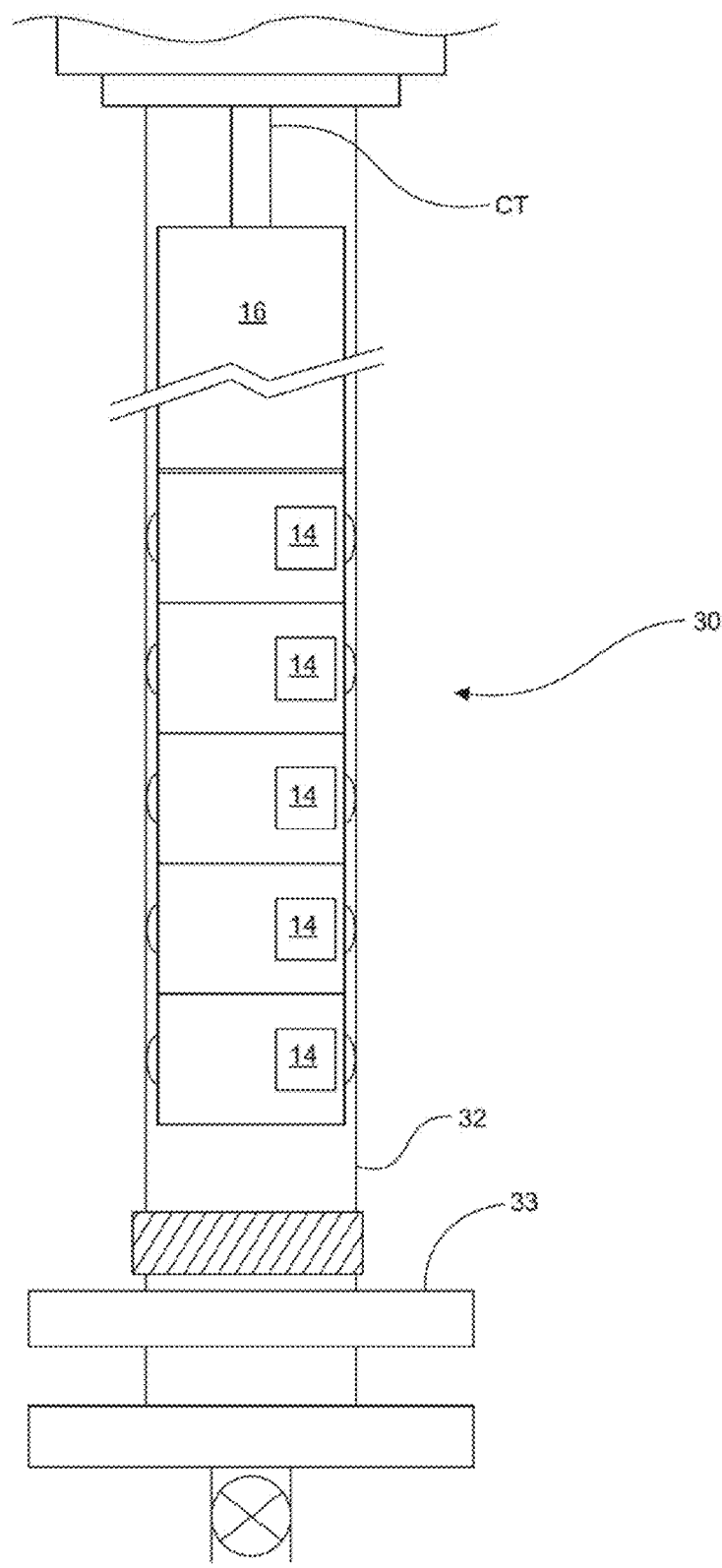
FIG. 5 is a representative illustration of a FIM tool having two or more modules incorporated therein according to embodiments taught herein and connected to a bottomhole assembly (BHA) for injection into a wellbore through a lubricator connected to a wellhead, the FIM tool being in a collapsed mode wherein spacing between the modules is minimized for minimizing a length of the FIM tool thereof.

Embodiments of a fracture imaging module having one or more 3-component sensors, a tool comprising two or more of the modules and method taught herein are used for detecting microseismic events in a formation from the same wellbore as is being treated or monitored. The modules are locked together in a compact mode which permits injection into the wellbore through a conventional lubricator which has a fixed length. Once injected into the wellbore, the modules are signaled to unlock from one another and thereafter are spaced from one another by apparatus which connects between the modules. The spaced modules form an axially spaced sensor array which increases the measurement window in the wellbore compared to sensor arrays which are conventionally injected through a fixed length lubricator. When the operation is complete, the modules are signaled to lock together again in the compact mode for pulling out of the hole through the lubricator.

In one broad aspect, a fracture imaging module (FIM) for detecting microseismic events when deployed in a directional wellbore, comprises a housing having one or more 3-component microseismic sensors housed in the housing. Apparatus for connecting axially between the housing and a housing of a like module is actuable between an extended mode, wherein the modules are spaced apart for detecting the microseismic events, and a compact mode, wherein space between the modules is minimized for running into and pulling out of the wellbore. A locking mechanism locks the module to the like module when in the compact mode.

In another broad aspect, a tool for detecting microseismic events when deployed in a directional wellbore using a conveyance string, comprises two or more modules. Each module has a housing and one or more 3-component microseismic sensors housed in the housing. Apparatus for connecting between the housing and a housing of each adjacent module, is actuable between an extended mode, wherein the two or more modules are spaced apart for detecting the microseismic events, and a compact mode, wherein space between the two or more modules is minimized for running into and pulling out of the wellbore. A locking mechanism locka the two or more modules together when in the compact mode, wherein a first, proximal module is connected to a distal end of the conveyance string and the remaining of the two or more modules are connected therebetween for forming an axial array of modules.

In yet another broad aspect, a method for measuring microseismic events in a directional wellbore comprises connecting a tool having two or more modules therein to a distal end of a conveyance string, each module comprising one or more 3-component microseismic sensors, the modules being locked together in a compact mode. The conveyance string and tool is injected in the compact mode into the wellbore through a lubricator. The tool is signaled to actuate from the compact mode to an extended mode in the wellbore, wherein the two or modules are spaced apart in an axial array. The microseismic signals are detected in the wellbore at one or more stages in the wellbore. The tool is signaled to actuate from the extended mode to the compact mode and the conveyance string and the tool is pulled, in the compact mode, from the wellbore through the lubricator.

Using embodiments taught herein, the economics of fracture imaging are improved The image data collection is achieved by simply adding the FIM tool to an existing tool or stimulation/fracturing BHA. Only the cost of the FIM modules is added to the completion cost without the cost of drilling, or preparing a remote wellbore and deploying sensors therein, or establishing surface acquisition or buried array systems. Embodiments provide the ability to collect more data from the wellbore and at each stage of operation. The data collected is more accurate because the FIM tool is positioned closer to the microseismic events than conventional monitoring systems. Further, as the FIM tool is connected to the conveyance string, the FIM tool moves therewith from stage to stage. Thus, the FIM tool is always positioned in the same place relative to the operation being performed. Thus, it becomes possible to compare data from stage to stage.

DETAILED DESCRIPTION

Embodiments taught herein address deployment and retrieval problems experienced by prior art systems and further, overcome observation distance limitations of the prior art systems, particularly as a result of the length of lubricators in general use for coiled tubing-deployed bottomhole assemblies (BHA).

PRIOR ART

As shown in FIGS. 1, 2A-2D and 3, a prior art FIM tool 10 generally comprises two or more modules 12, each module 12 having a sensor 14, such as a 3-component-type geophone, incorporated into a BHA 16 used for treatment of a wellbore 18, such as by fracturing. The two or more sensors 14 are spaced from each other along a length of the FIM tool 10 and are isolated from the flow of fracturing fluid in the BHA 16, such as by being positioned downhole from a treatment head 20 incorporated therein. The two or more sensors 14 are coupled to casing 22 or the wellbore 18 and the orientation of each of the sensors 14 is known or can be mathematically adjusted for orientation and thereafter interpreted. The spacing between the two or more sensors 14 however is limited by the size of a lubricator at surface used to inject the BHA 16 and FIM tool 10 into the wellbore 18. Practically, the spacing is at least 1 m apart and may be from about 5 m to a maximum of about 10 m apart. In embodiments, three or more sensors 14 were used to minimize directional ambiguity as described below.

The closer the sensors 14 are positioned to fracturing events in a surrounding formation 24, and because there is replication of the arrival times of both compressional (p) and shear (s) waves at each of the sensors 14 permitting calculation of distance, precise knowledge of velocity becomes less important and thus, the closer spacing may be satisfactory. However Applicant believes that unacceptable errors may still occur as a result of the relatively short spacing of the sensors 14.

More particularly, as shown in FIG. 2A, each 3-component microseismic sensor 14 comprises three orthogonally-oriented geophones $26x, 26y, 26z$. A first benefit is to account for the uncertainty in where the source of incident energy originated. By having three orthogonal geophones $26x, 26y, 26z$, one is able to capture incident energy arriving from any direction. Since any single geophone $26x, 26y$ or $26z$ is only capable of capturing motion in a single direction, at least three geophones $26x, 26y$ and $26z$, oriented orthogonally in each sensor 14, permits capturing motion in any one arbitrary direction.

Secondly, with the ability to detect motion in any direction, one can capture both compressional (p) waves, having particle motion in the direction of propagation, and shear (s) waves, having particle motion perpendicular to the direction of propagation, with equal fidelity.

Thirdly, by measuring the difference in arrival time between the observed compressional and shear wave arrivals for a single event, in combination with an understanding of the local velocity structure, a distance from the 3-component microseismic sensor 14 can be calculated for the origin of that event.

Fourthly, both azimuth and inclination of the waveform impinging on the 3-component microseismic sensor 14 can be determined. By a process referred to as hodogram analysis, which involves cross-plotting of the waveforms recorded on pairs of geophones, the direction of arrival at any 3-component microseismic sensor 14 can be determined, to within 180 degrees. Effectively, the vector defining the direction from which the energy impinged on a single 3-component microseismic sensor 14 would have a sign ambiguity. The direction of arrival could be either (x,y,z) or (−x,−y,−z).

With reference also to FIG. 3, by adding a second 3-component microseismic sensor 14 at some distance from the first 3-component microseismic sensor 14, directional ambiguity can be substantially eliminated. The second 3-component microseismic sensor 14 permits measurement of a time delay between the observed p or the observed s wave arrivals on each of the first and second 3-component microseismic sensors 14. One can then tell which, of the two possible arrival directions, is the correct one, as the arrival is delayed at the further sensor 14. The only problem is if the event origin F1, F2 is located on the plane that bisects the first and second 3-component microseismic sensors 14, which, in reality, is most likely due to noise contamination, the region of ambiguity likely being larger than simply the bisecting plane. Adding a third 3-component microseismic sensor 14, spaced some distance from the first and second 3-component microseismic sensors 14, substantially eliminates the final uncertainty.

Monitoring of microseismic events in real time provides the ability to understand where a fracture is positioned in the formation 24 and the direction and speed the fracture is growing in all directions (x,y,z) relative to hydraulic fracturing pumping rates, the particular fracturing fluid, and any number of other parameters with respect to the fracturing operation. The ability to rapidly optimize the design and placement of fractures provides the ability to build databases related thereto which may be of great use to the industry in improving fracture operations. Further, such information permits data, such as where the fluid has gone, to be provided for the public record regarding each stage of the fracturing operation and fracture location and extent.

Particularly advantageous, when monitoring in real time, is the ability to determine whether a fracture has broken out of a zone, or is imminently in danger of breaking out of the zone so that pumping can be stopped. This is of great interest for many reasons, one of which being where the fracture is breaking towards a water zone.

Growth of a fracture, vertically or horizontally at a certain rate, may be related to the pumping rate and concentration of the fracturing fluid. Over time and using the data obtained by embodiments disclosed herein, one could design a fracturing operation to achieve maximum vertical height without breaking out of the zone and maximum, economic horizontal displacement leading to horizontal well spacing optimization and field development optimization.

In the case of openhole wellbores, embodiments using microseismic monitoring are less susceptible to noise as there is less transmission of noise in the wellbore 18 without the casing or liner 22.

Optionally, the prior art FIM tool 10 can be operated in a memory mode, the data being stored in the 3-component microseismic sensors 14 equipped with memory and a battery, for later retrieval with the BHA 16, other wellbore tool or alone.

As shown in FIGS. 2A-2D, the 3-component microseismic sensors 14 typically have coupling means 28, such as an outwardly extending arm or clamp, a weighted housing and swivel connection, or the like, to acoustically couple the 3-component microseismic sensor 14 to the casing 22 or open hole. Regardless the orientation, as long as the 3-component microseismic sensor 14 is coupled to the casing 22 and the orientation of the 3-component microseismic sensor 14 is known, such as through a microelectromechanical system (MEMS) sensor, the data can be mathematically adjusted for orientation and thereafter interpreted.

Field Testing—Fixed Length FIM Tool

Applicant has conducted field tests using a fixed length FIM tool, such as described in Applicant's US Published patent application 2015-0075783-A1, a 371 application from PCT/CA2013/050329, and US Published patent application 2015-0135819, a 371 application from PCT/CA2013/050441 and as shown herein in FIGS. 1-3.

In the field tests conducted, a prior art, fixed length FIM tool 10 of approximately 7 m in length, having two sensors 14 spaced apart a relatively short, fixed length of approximately 2 m, was used. It was determined that 3D positioning of a microseismic event outside the wellbore 18 in which the FIM tool 10 was tested was exposed to error.

FIG. 4A illustrates data received at the sensors 14 in the fixed length FIM tool 10. Where the sensors 14 are closely spaced, it is known that data arrives at the sensors 14 at almost the same time and thus, one cannot make meaningful calculations as to how far away the signals were actually generated.

Conventionally, others use remote wellbores to achieve a geometry that permits a more meaningful calculation of event location. Applicant believes data collected using embodiments taught herein will provide data which is similar to that generated in a remote well without the additional costs associated with drilling the remote well and deploying a separate tool therein.

FIG. 4B is a typical data trace from a remote observation well to illustrate the benefits of the improved geometry when compared to FIG. 4A. It can be seen that the signals arriving at the sensors deployed in the vertical observation well are separated in time thus calculations of location are more meaningful as compared to the data in FIG. 4A.

Extendable/Collapsible FIM Embodiments

Embodiments taught herein facilitate greater spacing between sensors 14 in an axial array of sensors 14, when deployed in the wellbore 18 using a conveyance string thereby increasing a measurement window in the wellbore 18. Errors in locating microseismic events occurring outside the wellbore 18 are reduced as a result. At the same time, consistent and much closer observation distances between the FIM tool's sensors 14 and active fracture ports for all stages of the treatment are maintained.

Further, the embodiments taught herein retract or collapse the spacing between each of the sensors 14, typically 3-component geophones or accelerometers or the like.

Embodiments are described herein in the context of a FIM tool 30 used in conjunction with a BHA 18 having a frac head 20 used for performing a fracturing operation. However, embodiments as described can be run into the wellbore 18 in conjunction with other downhole tools or can be run into the wellbore alone using wireline, coiled tubing CT, electrically-enabled coiled tubing or other such conveyance strings. By way of example, embodiments can be run-in below perforations using a conveyance string to below perforations in a conventional plug and perf operation to image the fractures or can be run-in to verify opening of sleeves by verifying the formation of fractures therethrough.

Further, embodiments can be injected through a lubricator into a live wellbore, remote from the wellbore being treated and expanded therein for monitoring microseismic events in the wellbore being treated. This avoids conventional methods which require use of only remote wellbores that are dead at the time the sensors are deployed therein.

Thus, as shown in FIGS. 5 to 8, a BHA 16 incorporating an extendable/collapsible FIM tool 30, according to embodiments taught herein, is maintained at a compact length (FIGS. 5 and 6), suitable for passing through a lubricator 32 connected to a wellhead 33 at surface, under pressure, and into the wellbore 18. The spacing between the sensors 14 in the FIM tool 30 is thereafter increased in the wellbore 18 for extending a measurement window therein (FIGS. 7 and 8) to reduce error.

The FIM tool 30 is positioned below the fracturing head 20 in the BHA 16, as in the prior art FIM tool. Best seen in FIG. 7, in embodiments the FIM tool 30 is acoustically decoupled from the BHA 16, such as by a cable or other non-acoustically transmissive connection 17 therebetween, to reduce noise measured as a result of vibration and movement of the BHA 16, thus minimizing the impact of the stimulation/fracturing operation on the microseismic monitoring. Furthermore, the FIM tool 30 is isolated from the fluid flow of the stimulation/fracturing operation thereabove which also helps minimize the impact of the fracturing operation on microseismic monitoring. While shown as being decoupled, in embodiments the decoupling is not required however noise levels in the data will likely be higher.

The FIM tool 30 is incorporated at a distal end 34 of the BHA 16, having the stimulation/fracturing tool and fracturing head 20 therein, to obtain or record microseismic data in the formation 24 thereabout. Data recorded by the sensors 14 in the FIM tool 30, when spaced apart in an extended mode, is minimally impacted by the stimulation/fracturing operation. The spaced sensors 14 forms a sensor array 36 having sufficient length, typically over tens of meters, to more accurately confirm events occurring in the formation 24 as microseismic events and is able to more accurately position the microseismic event in 3D space at each stage of a fracturing operation.

Embodiments of the FIM technology are available in several data modes, including memory or real-time-to-surface. Real-time-to-surface may be accomplished in a variety of ways, including but not limited to use of electrically-enabled coiled tubing or electrically and fiber-optic-enabled coiled tubing, such as IntelliCOIL™. Further, embodiments may use a stimulation or fracturing tool that is either electric or mechanical with electric/fiber-optic feed through to the FIM tool, or mechanical with wireless communication across the stimulation or fracturing tool between the FIM tool and the coiled tubing.

Further, as described in the applications to Kobold Services Inc., referenced above, fiber-optic cable, distributed along at least a portion of the coiled tubing, can be used for cancellation of noise, resulting from vibration and movement of the coiled tubing and BHA, from the microseismic data.

Embodiments taught herein can be deployed using coiled tubing rigs having conventional length lubricators without pressure deployment or can be pressure deployed, as desired. As the sensors of the FIM tool are collapsible to a compact mode at both surface, to run-in-hole (RIH), and downhole, to pull-out-of-hole (POOH), deployment and retrieval of the entire BHA, including the FIM tool, is possible in a lubricated scenario on live wells using conventional length lubricators.

Having reference to FIGS. 5 to 12, in embodiments, the extendable/collapsible FIM tool 30 comprises two or more modules 40, each module 40 comprising a microseismic sensor 14, typically a 3-component geophone/accelerometer cluster, for forming an axially extending array of modules 40.

While described herein in the context of each module 40 of the FIM tool 30 having a sensor 14 therein, it is understood that more than one 3-component geophone/accelerometer cluster 14 can be used in each module 40. The additional 3-component clusters 14 acts as a redundancy should one or more of the sensors or components fail.

Having reference again to FIGS. 5 and 6, embodiments are collapsible to provide a shortened, compact assembly both for lubricating (FIG. 5) and deploying into and out of the wellbore 18 (FIG. 6), under pressure, and later retrieval. Generally, embodiments of the FIM tool 30 are run in horizontal or deviated wells, therefore gravity may or may not be available to assist in increasing the spacing of the modules 40 and sensors 14 therein. As taught however, embodiments are suitable for deployment even in horizontal or deviated wells.

As shown in FIGS. 7 and 8, when the FIM tool 30 is in the extended mode in the wellbore 18, the two or more modules 40, and thus the sensors 14, are spaced 10's of meters apart, for example from as little as about 5 m apart up to about 50 m or about 100 m apart for obtaining data for accurate 3D placement of a microseismic event in the formation 24 about the wellbore 18. The spacing of the FIM tool's sensors 14 is directly related to accuracy of detection of the events in 3D space. Generally, within limits related to decrease in amplitude of an event, the larger the spacing the more accurate the positioning of a microseismic event. As one of skill will appreciate however, as the event amplitude decreases with distance, continuing to increase the length of the FIM tool beyond an optimal length may not continue to increase the accuracy of the positioning.

Actuation Between Compact and Extended Modes

Once deployed into the wellbore, the FIM tool 30 is actuated to the extended mode to space the modules 40 and sensors 14 apart to extend the measurement window in the wellbore 18. Actuation to increase the spacing between the modules 40 and sensors 14 can be accomplished in a variety of different ways, including but not limited to mechanical, electronic or direct powered and controlled systems or combinations thereof.

In the case of mechanical actuation, as shown in FIGS. 9A-10D, a coded sequence of movements, such as by the coiled tubing CT and BHA 16 to which the FIM tool 30 is connected, are performed to extend the modules 40 from the compact mode to the extended mode having the increased spacing between the sensors 14.

In embodiments, as shown in FIGS. 7 and 8, the modules 40 are mechanically connected therebetween by apparatus 42, such as telescoping rods, tethers or cables which can be actuated to extend or pay-out to allow the modules 40 to move away from one another. In embodiments, the modules 40 may be detached from the BHA 16 or from one another, such as by overcoming a magnetic force. In such an embodiment, the tool is run into the wellbore to a desired location of the distal module and the distal module is disconnected from the FIM tool. The BHA is then lifted in the wellbore to the desired location of the next module and the module is disconnected from the FIM tool. This process is repeated for all of the modules in the FIM tool. Thereafter, when the FIM to is to be collapsed to the compact mode, the BHA is run into the wellbore and each of the modules is collected, such as by magnets or other connection and locking means. Alternatively, motive means such as tractors or other techniques such as pressurizing the wellbore, actuating hydraulics or other means may be used to space the modules 40.

In embodiments electronic actuation systems in the modules 40, are signaled electronically to extend and retract the apparatus 42 used for spacing the modules 40 apart. As shown in FIG. 8, in embodiments, the apparatus 42 comprises pulley drives 44, which are electronically-actuated to reel in or pay-out a tether 46 connecting between the modules 40. In embodiments, battery powered systems may be utilized in combination with drive systems to extend and retract means for spacing the modules/sensors apart.

In embodiments where power is available downhole via electrically-enabled CT, such as IntelliCOIL™, or the like, control systems at surface may be used to directly actuate means for increasing and decreasing space between sensors, such as to latch and unlatch the modules 40 from one another and to drive winches or sprockets to wind up or pay-out tethers connecting therebetween. Embodiments of such systems may also be capable of real time feedback to surface to confirm that the modules 40 are in a fully extended mode or in a fully compact mode or are somewhere between the two.

In embodiments taught herein, each of the FIM modules 40 comprise at least one 3-component sensor 14, typically an accelerometer and/or geophone. Where the modules 40 are not operating in a real-time mode, either hardwired to surface or some other communication method to surface, data storage in memory mode and a battery are required in the FIM module. Further, for all sensors 14, if each module 40 is completely disconnected from the others, or for at least one sensor 14, if all the modules 40 are connected to one another, high side (HS) orientation can be used to eliminate the requirement for string shots in another well to orientate the sensors 14, which provides a logistical advantage and a cost savings. String shots are also conventionally used for sensor calibration. In fracturing operations where sleeves are shifted to open ports in the casing, the impact of the shifting sleeve causes an event which may be used for sensor calibration and timing, also permitting elimination of string shots. As with the prior art fixed length FIM tool 10, regardless the orientation, as long as the 3-component microseismic sensor 14 is coupled to the wellbore 18 or casing 22 and the orientation of the 3-component microseismic sensor 14 is known, such as through a microelectromechanical system (MEMS) sensor, the data can be mathematically adjusted for orientation and thereafter interpreted.

Ideally, all of the sensors 14 in the FIM tool 30 are connected to one clock to provide greatest accuracy, however if the sensors 14 are running on separate clocks, the clocks require frequent calibration. Calibration can readily be performed every time a sleeve is shifted open or closed at every stage in the well. In order to run the sensors off one clock, the sensors are hard wired together or a communication system, such as radio frequency, is used to tie the clocks together.

Following the treatment operation for removal through the lubricator 32 or prior to deployment through the lubricator 32 to perform the treatment operation, the FIM tool 30 is actuated to collapse to the compact mode. Apparatus 42 used to space between the sensors 14 is caused to decrease in length, such as by relaxing, reeled in or otherwise retracting to decrease the space between the modules 40.

In embodiments, to maintain the FIM tool 30 in the compact mode during pressure deployment or removal through the lubricator 32, the modules 40 are locked together using a locking mechanism 50. The locking mechanism 50 can include, but is not limited to, magnets, latches, collet fingers, a stinger, a brake applied to a reeled-type tether system and the like. The locking mechanism 50 can be actuated mechanically, electronically or directly as discussed above.

In an embodiment, the FIM tool 30 is collapsed to the compact mode, locked together and is deployed through the lubricator 32 and is run to TD in the wellbore 18. A signal or code is delivered to the actuation and/or locking instrumentation in each module 40, such as through electrically-enabled coiled tubing, acoustics, pressure or the like, to release the modules 40 from one another to permit spacing the modules 40 to the extended position. Releasing the modules 40 can be by unlocking a brake, such as on reeled tethers, or releasing a physical connection such as a latch or by reversing polarity of a magnet, or the like.

In an embodiment, the coded signal is an acoustic signal, such as seismic vibration from a seismic vibrator placed on surface which sends a configured sequence of vibrations to the electronics in the module 40.

In another embodiment, the coded signal is a unique preset sequence of movements of the conveyance string and/or the BHA 16, detectable by instrumentation in each module 40. As the BHA 16 is advanced in the wellbore 18 and approaches TD, the BHA 16 is moved in a unique, coded series of downhole incremental movements with pauses or stops therebetween which signals the FIM tool 30 to unlock the modules 40 from one another.

Having reference to FIGS. 9A to 9D, thereafter, the BHA 16 is pulled uphole, the coupling mechanism 28 on each of the FIM modules 40, such as an outwardly extending member, such as an arm, a clamp or a leaf spring or the like, or means to offset the module 40 to engage the wellbore 18 or casing 22, providing drag thereto. As the BHA 16 moves uphole, the pulling force begins to drag the modules 40 uphole with the BHA 16 when sufficient pulling force overcomes the resistance of the drag force asserted by each of the coupling mechanisms 28. A proximal module 40a is the first to move uphole with the BHA 16, causing the apparatus 42 connecting therebetween to extend for increasing the spacing the first module from the remaining modules 40b, 40c, 40d . . . . Thereafter, as the pulling force increases incrementally, so as to drag the already spaced modules 40 with the BHA 16 and sufficient to overcome the drag force of each of the remaining modules 40b, 40c, 40d . . . therewith each of the remaining modules are spaced apart and the FIM tool 30 is in the extended mode. The FIM tool may or may not be in a fully extended mode at the first stage of the fracturing operation, however, the modules are sufficiently spaced apart compared to the fixed length FIM tool so as to provide a suitable geometry to obtain usable data. Thereafter, the extended FIM tool 30 is moved uphole within the wellbore 18 from stage to stage as the fracturing operation continues. Thus, the spaced sensors 14 in the extended FIM tool 30 remain positioned adjacent events occurring in the formation regardless the location of the fracturing operation in the wellbore 18. This is in direct contradistinction to sensors 14 placed in remote wellbores which are generally situated intermediate a horizontal leg of the wellbore 18 and at a distance of from about 200 m to about 400 m therefrom. Thus, data, collected adjacent the toe and the heel of the wellbore 18 using the prior art, is exposed to greater difficulty in interpretation as the microseismic events are located farther from the sensors 14.

At the end of the monitoring operation, to remove the BHA 16 and FIM tool 30 from the wellbore 18, the BHA 16 is moved in a coded sequence of uphole incremental movements with pauses or stops therebetween to the apparatus 42 to decrease the spacing between the modules 40 and/or signal the locking mechanism 50 to engage the modules 40 when the spacing therebetween is decreased to the compact mode. Thereafter the BHA 16 and FIM tool 30 is moved downhole, the proximal module 40*a* engaging the adjacent module 40*b* which locks thereto. As the BHA 16 and FIM tool 30 is continued to be moved further downhole, each of the subsequent modules 40*c*.40*d* are latched until the FIM tool is in the collapsed, compact mode. Thereafter the BHA 16 and FIM tool 30 can be run-in to the toe, if frac sleeves are to be closed and then pulled out-of-hole (POOH) through the lubricator 32, or simply POOH through the lubricator 32 when the FIM tool 30 is in the compact mode.

Figure 11:
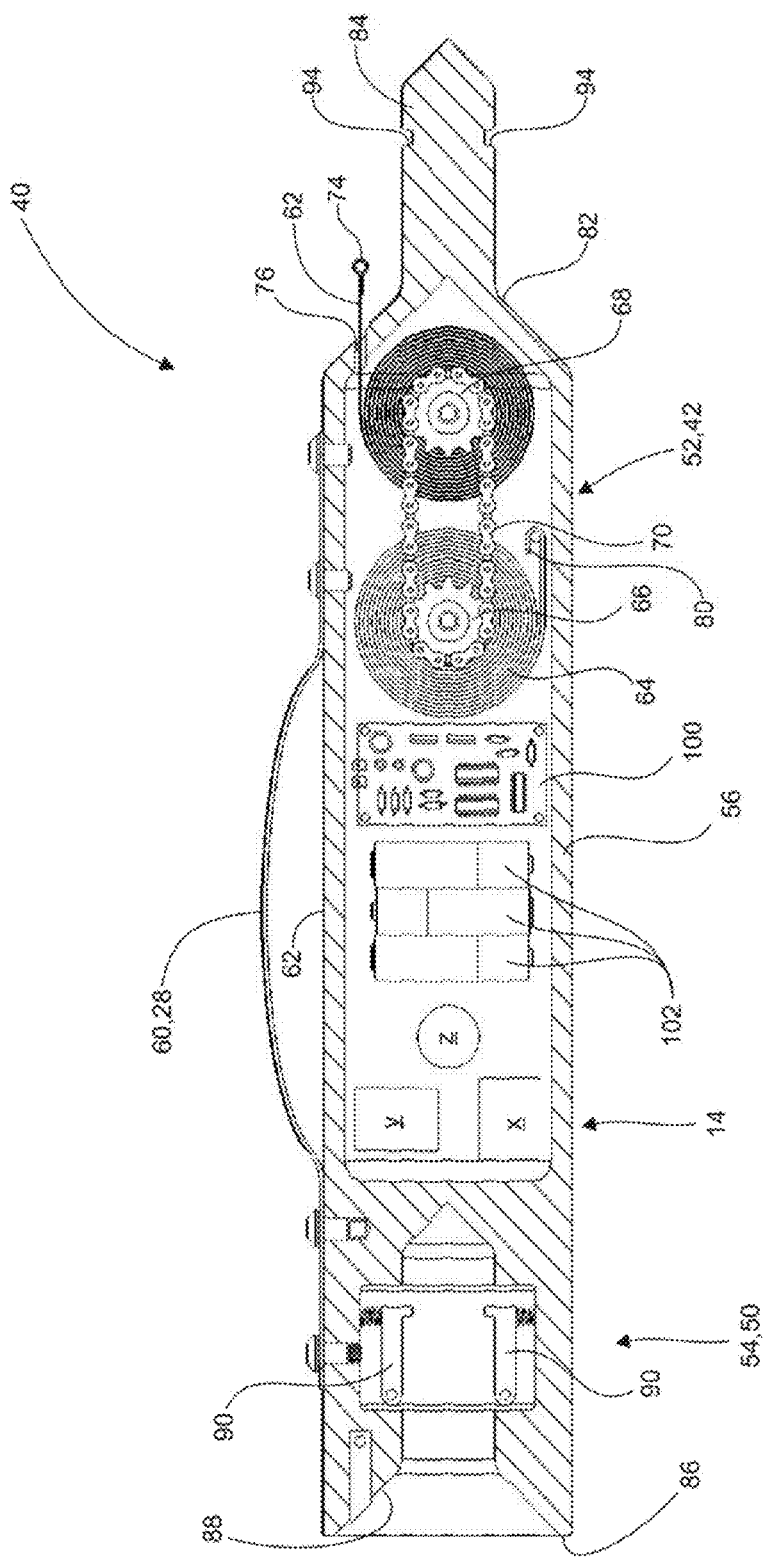
FIG. 11 is a cross-sectional view of an embodiment of a module of a FIM tool.
Figure 12:
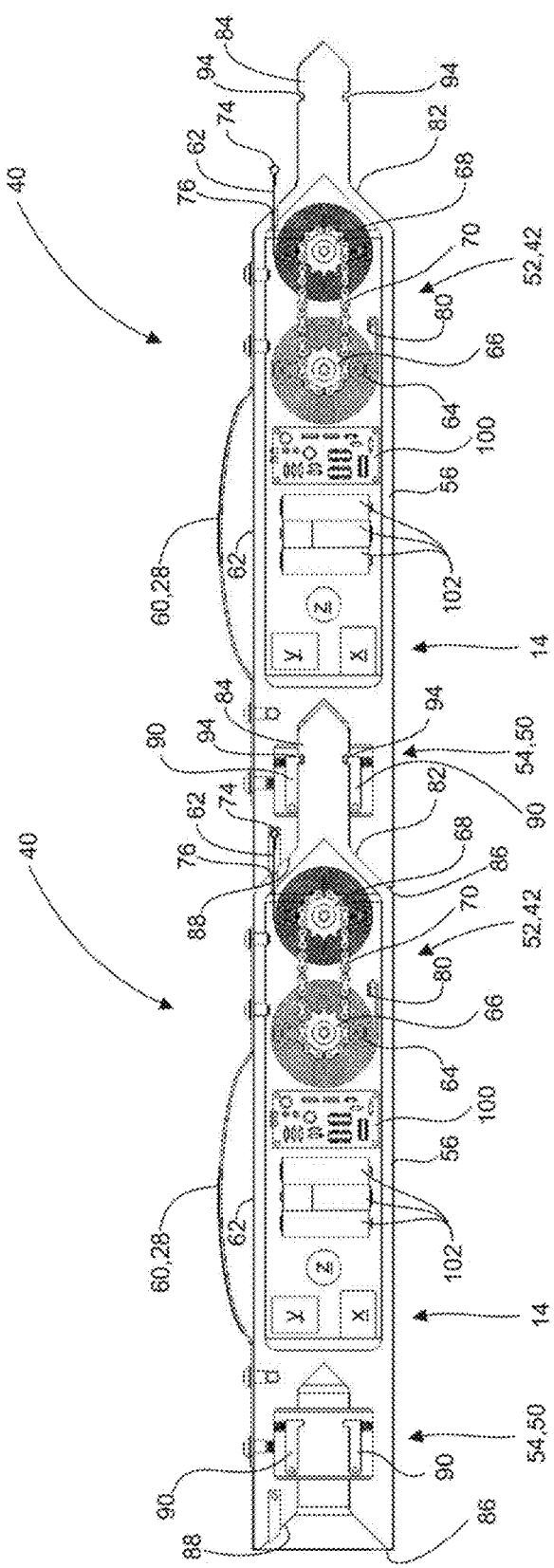
FIG. 12 is a cross-sectional view of a FIM tool comprising modules according to FIG. 11.

Having reference to FIGS. 11 and 12, in an embodiment, a FIM module 40, for use in assembling the FIM tool 30 having two or more of the modules 40, further comprises a tether mechanism 52 as the apparatus 42 for connection between the two or more modules 40 to permit adjusting the spacing therebetween and a latching assembly 54 as the locking mechanism 50 for locking the modules 40 together in the compact mode.

Each module 40 comprises an elongate tubular housing 56 having a cavity 58 formed therein. The cavity 58 houses the sensor 14, typically a 3-component geophone or accelerometer (x,y,z), and the tether mechanism 52. Drag means 60, including, but not limited to any of a variety of known drag means such as a leaf spring, is attached to an outer surface 62 of the housing 56 to create drag against the wellbore 18 or casing 22 against which the modules 40 are pulled by the BHA 16, to allow the tether mechanism 52 to pay-out for spacing the modules 40 apart. The drag means 60 further acts as the coupling means 28 to couple the 14 sensor to the wellbore 18 or casing 22.

The tether mechanism 52 comprises a tether 62 which is maintained in constant tension. In an embodiment, the tether mechanism 52 further comprises a return spring 64 wound on a first sprocket 66 and the tether 62 is wound on a second sprocket 68. The first and second sprockets 64,68 are spaced apart and connected therebetween by an endless drive chain 70. A first end 72 of the tether 62 is fixed to the second sprocket 68 and a second, free end 74 of the tether 62 extends through a port 76 in the housing 56 for connection to the housing 56 of an adjacent, like module 40. A first end 78 of the return spring 64 is connected to the first sprocket 66 and a second end 80 is connected to the housing 56. The return spring 64 tightens around the first sprocket 66 as the pulling force is applied to the tether 62, thus placing the tether 62 in constant tension. When the pulling force is released from the tether 62, the return spring 64 is biased to return to its original shape, releasing energy stored therein and acts to drive the second sprocket 68 to wind the tether 62 thereon. In embodiments the tether 62 is a spiral tape or KEVLAR® cord.

A length of the tether 62 between the modules 40 is increased to permit spacing between the modules 40 to be increased when the tether 62 is payed-out from the second sprocket 68 as the tether 62 is pulled therefrom when the BHA 16, to which the modules 40 are operatively connected, is pulled uphole against the drag force created by the drag means 60.

A first neck end 82 of the housing 56 has an axially extending, profiled neck 84 formed thereon. A second latch end 86 of the housing 56 has a shaped recess 88 formed axially therein for engaging therein the profiled neck 84 of an adjacent, like module 40 to which the tether 62 is connected.

As shown in FIG. 12, the shaped recess 88 further comprises the latching mechanism 50 for engaging the profiled neck 84 of the adjacent like module 40 inserted therein, for forming the FIM tool, when the tether 62 connecting therebetween has been reeled in, drawing the neck 84 of one module 40 into the recess 88 of the adjacent module 40 and collapsing the space therebetween.

In an embodiment, the latching mechanism 50 comprises opposing, pivoting latch fingers 90 which are biased radially inward to a latched position, such as by biasing springs 92 connecting between the latch fingers 90 and the recess 88. The profiled neck 84 has opposing notches 94 formed thereon, extending radially inwardly into the neck 84, for receiving the latch fingers 90 in the latched position.

In embodiments, the cavity 58 further houses electronic circuitry 100 capable of sensing signals, such as the coded sequence of uphole incremental movements with pauses or stops therebetween described above, which actuate the latching mechanism 100 to latch and unlatch the latch fingers 90 from the opposing notches 94 to permit changing the spacing of the modules 40 between the extended mode and the compact mode, as discussed above, as a result of movement of the BHA 16 in the wellbore 18.

Further, the cavity 58 houses a battery or batteries 102 which power the latching mechanism 50 to latch and unlatch. The batteries 102 may also power memory for storage of data if not operated in a real-time-to surface mode.

As will be appreciated, the apparatus 42 for extending and retracting the tether 62, is protected from sand and other debris.

Embodiments of a fracturing process incorporating embodiments of the FIM tool 30, wherein imaging of fracture growth and placement is performed from within the same wellbore 18 as is being fractured, offers several advantages. First, economics are improved as it is much more cost effective to collect data from the wellbore 18 being stimulated. The image data collection via the FIM tool 30 is achieved by simply adding the FIM tool to an existing stimulation/fracturing BHA 16. The cost of the FIM modules 40 is added to the completion cost without the cost of drilling or preparing a remote wellbore and deploying sensors therein or establishing surface acquisition or buried array systems. Embodiments provide the ability to collect more data from the wellbore and each stage of operation. The data collected is more accurate because the FIM tool 30 is positioned closer to the microseismic events than conventional monitoring systems. Further, as the FIM tool 30 is connected to the BHA 16 and moves within the wellbore 18 with the BHA 16, the FIM tool 30 is always positioned in the same place relative to each frac port in the casing 22 and the fracture pattern that is expected to occur outside the casing 22. Thus, it becomes possible to compare data from stage to stage.

In summary, extending the spacing between the sensors 14 in the FIM tool 30 optimizes clarity as to the nature of events outside the wellbore 18, positioning accuracy of the event, the ability to tolerate more noise in the system during the stimulation/fracturing operation.

Microseismic events that originate within the formation 24 adjacent the wellbore 18 have expected characteristics. In the absence of all background noise, a small number of 3-component sensors closely spaced may be sufficient to confirm the existence of an event. In the presence of noise, the ability to identify an event is diminished, as is the ability to properly position it. Additionally, false "events" may be generated by various intra-well activities such as slippage of the fracture fluid delivery tool and movement of the CT resulting from changes in pumping pressure and/or injector weight. Determining the validity of a detected event using a short array with a small number of 3-component sensors is difficult, resulting in the possible rejection of a large number of events that may in fact be valid.

Again, in the absence of background noise, a small number of 3-component sensors, appropriately spaced, are sufficient to detect and position a microseismic event. Automated detection can be done by a variety of means that typically compare some variation of the ratio of windowed RMS amplitudes and look for a threshold to be exceeded (the STA/LTA method for example). Positioning is accomplished by determining the direction from which the energy radiating from the microseismic event impinges on the 3-component sensor(s). This can be done, for instance, by hodogram analysis, or by vector rotation of the 3-component data to maximize the event energy onto a single component for example. These processes yield a back projection vector pointing towards the microseismic event location. One method of identifying an event location would be to calculate the intersection point of these back projection vectors for a number of independent 3-component sensor locations.

The addition of background noise introduces an error in the back projection angles, which lead to positioning errors. By increasing the separation distance between the 3-component sensor locations in the wellbore, errors of this nature can be reduced.

Increasing the total number of 3-component sensors that observe an event can further reduce the error. Location accuracy can be improved by independently calculating the distance between the event location and the individual 3-component sensors. This is done by identifying the time differential between arrival of the compressional (P) and shear (S) waves at the 3-component sensor. Differential arrival times can be as little as 0.15 msec/meter of separation to maybe as much as 0.5 msec/meter of separation. In order to identify independent onset of P and S arrival times as much as 10 msec or more of separation between the two may be necessary (dependent on amount of background noise present). This implies the distance between the 3-component sensor and the event location may need to be as much as 67 meters (bad case, fast formation velocities) or as little as 20 meters (good case, slow formation velocities). For microseismic event locations near the wellbore, and assuming locations near the active frac port, this requires the 3-component sensor array to extend at least 50 meters downhole of the frac port.

The background noise that contaminates the microseismic event is confined to the wellbore and has been observed to travel both up and down the wellbore with predictable velocities. Background noise can be the result of pressure pulses generated by the frac pumps, mechanical noise originating at the well site or from other sources. These noises travel down the well fluid, the CT, the well casing, or some combination of all three.

To mitigate the effect of this noise on the ability to detect and position a microseismic event, a plurality of 3-component sensors are located, such that they are not all impacted by the noise trains at the same time. This is accomplished by spacing the individual 3-component sensors apart, with the ideal sensor spacing governed by velocities of the background noise. Additionally, the number of individual 3-component sensors should be as large as possible depending on the physical constraints needed to deploy and retrieve the sensors.

The invention claimed is:

1. A fracture imaging module (FIM), for detecting microseismic events in a formation, comprising:
a housing;
one or more 3-component microseismic sensors housed in the housing;
an axial connection between the housing and a housing of a like module and actuable between an extended mode, wherein the module and one or more of the like modules are spaced apart for locating and monitoring a direction of the detected microseismic events, and a compact mode, wherein space between the modules is minimized for running into and pulling out of the formation; and
a locking mechanism for locking the module to the like module when in the compact mode.

2. The module of claim 1 wherein the axial connection is actuated by a pulling force applied to the module, the module further comprising:
drag means connected to the housing for engaging a wellbore of the formation and resisting movement in the wellbore, wherein when the drag means is overcome by the pulling force on the module, the axial connection is actuated and the module moves relative to the like module for establishing the spacing therebetween in the extended mode.

3. The module of claim 2 wherein the axial connection comprises a tether mechanism having
a return spring, biased to an original shape, and wound about a first sprocket;
a tether wound about a second sprocket, a free end thereof extending through a port in the housing for connection to the housing of the like module; and
an endless drive chain for connecting between the first and second sprockets, wherein
when the pulling force is applied to the tether, the tether is payed-out from the second sprocket for extending a length of the tether and the return spring is tightened about the first sprocket, the tether being placed in constant tension; and
when the pulling force is released, the return spring returns to the original shape, driving the endless chain to rotate the second sprocket for winding the tether thereon.

4. The module of claim 1 wherein the axial connection spaces the module tens of meters apart from the like module in the extended mode.

5. The module of claim 1 wherein the axial connection spaces the module from about 50 meters to about 100 meters from the like module.

6. The module of claim 1 further comprising electronic circuitry for actuating the locking mechanism to lock the module to an adjacent module of the one or more like modules in the compact mode and to release the module to permit spacing of the module from the one or more like modules in the extended mode.

7. The module of claim 6 wherein the electronic circuitry receives a coded signal for actuating the locking mechanism, wherein the coded signal is an acoustic signal, an electronic signal, pressure pulsing or a sequence of movements of a conveyance string connected to the module.

8. The module of claim 1 wherein the locking mechanism comprises one or more of magnets, latches, collet fingers, a stinger or a brake applied to the axial connection between the housing and the housing of the like module.

9. The module of claim 1, wherein a neck end of the housing comprises a profiled neck extending axially therefrom; and an opposing latch end of the housing comprises a shaped recess therein, the locking mechanism comprising:

a latch mechanism for engaging between the shaped recess of the module and a profiled neck of the like module when engaged in the shaped recess.

10. The module of claim 9 wherein the latch mechanism comprises:
opposing notches formed on the profiled neck; and
opposing, pivoting latch fingers connected to the housing and biased radially inward into the recess to engage the opposing notches on the like module in a latched position.

11. The module of claim 10 further comprising electronic circuitry to overcome the biasing and cause the latch fingers to pivot to release from the opposing notches.

12. The module of claim 1 wherein data from the one or more 3-component microseismic sensors is stored in the module for retrieval at surface, the module further comprising:
data storage means housed in the housing; and
one or more batteries for powering the data storage.

13. A tool for detecting, locating and monitoring a direction of microseismic events in a formation, when deployed in a directional wellbore in the formation using a conveyance string having a proximal end at surface and distal end in the wellbore, comprising:
two or more modules, each module having
a housing;
one or more 3-component microseismic sensors housed in the housing;
an axial connection between the housing and the housing of an adjacent module of the two or more modules for forming an axial array of the two or more modules, the axial connection being actuable between an extended mode, wherein the two or more modules are spaced apart for detecting the microseismic events, and a compact mode, wherein space between the two or more modules is minimized for running into and pulling out of the wellbore; and
a locking mechanism for locking the two or more modules together when in the compact mode,
wherein a first module of the array of the two or more modules is connected to the distal end of the conveyance string.

14. The tool of claim 13 further comprising:
drag means connected to the modules' housings for engaging the wellbore and resisting movement therein when a pulling force is applied thereto; and
wherein the axial connection comprises a tether mechanism housed in the housing and having
a return spring, biased to an original shape, and wound about a first sprocket;
a tether wound about a second sprocket, a free end thereof extending through a port in the housing or connection to the housing of the adjacent module; and
an endless drive chain for connecting between the first and second sprockets, wherein
when the pulling force is applied to the tether, the tether is payed-out from the second sprocket for extending a length of the tether and the return spring is tightened about the first sprocket, the tether being placed in constant tension and the two or more modules being spaced apart; and
when the pulling force is released, the return spring returns to the original shape, driving the endless chain to rotate the second sprocket for winding the tether thereon for minimizing the spacing between the two or more modules.

15. The tool of claim 13 wherein the first module is connected to the conveyance string using a non-acoustically transmissive connection therebetween for decoupling the tool from the conveyance string.

16. The tool of claim 13 wherein the axial connection between the two or more modules spaces the modules tens of meters apart in the extended mode compared to the compact mode.

17. The tool of claim 13 wherein the axial connection between the two or more modules spaces the modules from about 50 meters to about 100 meters apart.

18. A method for detecting, locating and monitoring a direction of microseismic events in a formation having a directional wellbore extending therethrough, comprising:
connecting a tool having two or more modules therein to a distal end of a conveyance string, each module comprising one or more 3-component microseismic sensors, the modules being locked together in a compact mode;
injecting the conveyance string and tool in the compact mode into the wellbore through a lubricator;
signaling the tool to actuate from the compact mode to an extended mode in the wellbore, wherein the two or more modules are spaced apart in an axial array;
detecting the microseismic signals in the wellbore at one or more stages in the wellbore;
signaling the tool to actuate from the extended mode to the compact mode; and
pulling the conveyance string and the tool in the compact mode from the wellbore through the lubricator.

19. The method of claim 18 wherein the signaling to actuate from the compact mode to the extended mode and from the extended mode to the compact mode comprises:
sending a coded signal to the two or more modules to actuate a locking mechanism therein to release the modules or to lock the modules, the coded signal being an acoustic signal, an electronic signal, pressure pulsing or a sequence of movements of the conveyance string connected to the two or more modules.

20. The method of claim 19 wherein the coded signal comprises a sequence of movements of the conveyance string, comprising:
following injecting the conveyance string and tool into the wellbore in the compact mode,
advancing the tool to approach total depth in the wellbore;
moving the conveyance string and tool a coded series of downhole incremental movements with pauses or stops therebetween for signaling a latching mechanism in the tool to unlock the two or more modules;
pulling the conveyance string and tool uphole to overcome a drag force of at least a first proximal module for spacing the first proximal module from remaining of the two or more modules; and
continuing pulling the conveyance string and tool uphole, using an incrementally increasing pulling force for overcoming the drag force of the spaced modules and each of the adjacent modules for spacing therebetween to the extended mode; and
following detecting the microseismic signals in the wellbore at one or more stages in the wellbore,
moving the conveyance string and tool in a coded sequence of uphole incremental movements with pauses or stops therebetween for signaling the latching mechanism to lock the modules together;

moving the conveyance string and tool downhole for engaging the first proximal module for locking thereto; and continuing to move the conveyance string and tool downhole for engaging each of the remaining modules for locking the two or more modules together in the compact mode for pulling out of hole through the lubricator.

* * * * *